No. 644,411. Patented Feb. 27, 1900.
G. W. DEAFENBAUGH.
BICYCLE DRIVING GEAR MECHANISM.
(Application filed Dec. 6, 1898.)

(No Model.) 2 Sheets—Sheet 1.

WITNESSES:

INVENTOR
G. W. Deafenbaugh
BY
ATTORNEYS

No. 644,411. Patented Feb. 27, 1900.
G. W. DEAFENBAUGH.
BICYCLE DRIVING GEAR MECHANISM.
(Application filed Dec. 6, 1898.)
(No Model.) 2 Sheets—Sheet 2.
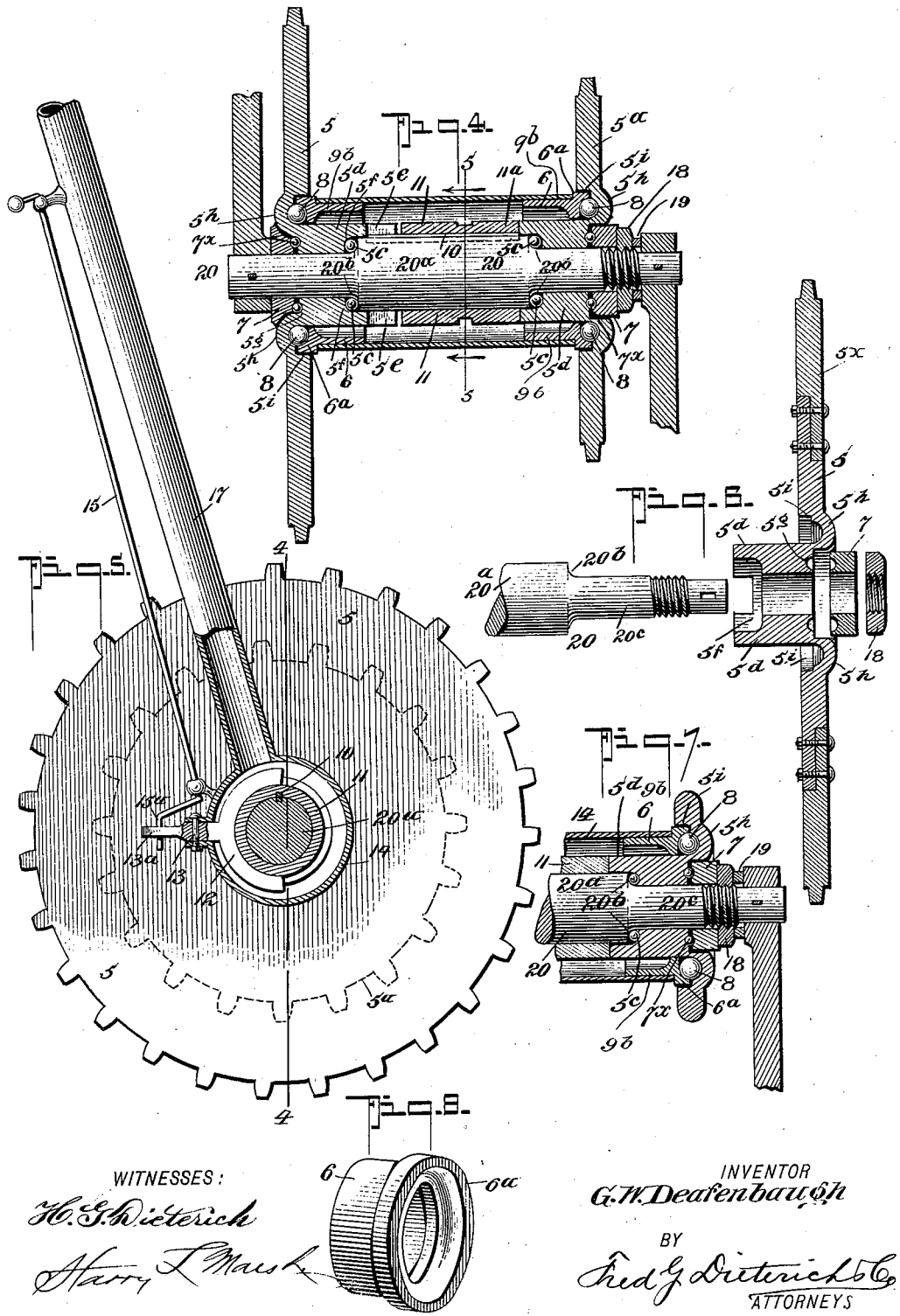
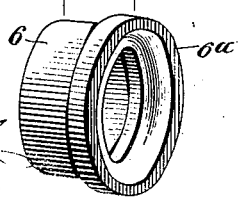
WITNESSES:
INVENTOR
G. W. Deafenbaugh
BY
Fred G. Dieterich & Co.
ATTORNEYS

UNITED STATES PATENT OFFICE.

GEORGE W. DEAFENBAUGH, OF BELLAIRE, OHIO.

BICYCLE DRIVING-GEAR MECHANISM.

SPECIFICATION forming part of Letters Patent No. 644,411, dated February 27, 1900.

Application filed December 6, 1898. Serial No. 698,442. (No model.)

*To all whom it may concern:*

Be it known that I, GEORGE W. DEAFENBAUGH, residing at Bellaire, in the county of Belmont and State of Ohio, have invented certain new and useful Improvements in Bicycle Drive-Gear Mechanism, of which the following is a specification.

This invention, which relates generally to improvements in bicycles, refers more particularly to that class of bicycles having a variable-speed gearing including a plurality of drive-gears and a duplex arrangement of drive-chains, one set of gearing being arranged on each side of the frame, which mechanism also includes suitable clutch devices, whereby the drive mechanism at opposite sides may be alternately moved into or out of an operative condition.

My invention has for its object to provide a variable-speed gear of the character stated of a very simple, economical, and stable construction, in which the several parts are so arranged as to produce a more permanent and true alinement of the ball-races and the bearing members, and in which the several parts are constructed so as to be detachably connected.

In its more specific nature my invention comprehends a peculiar and novel construction of hub members with which the drive gear-wheels may be integrally or detachably connected, all of which will hereinafter be first described in detail and then specifically pointed out in the appended claim, reference being had to the accompanying drawings, in which—

Figure 1:
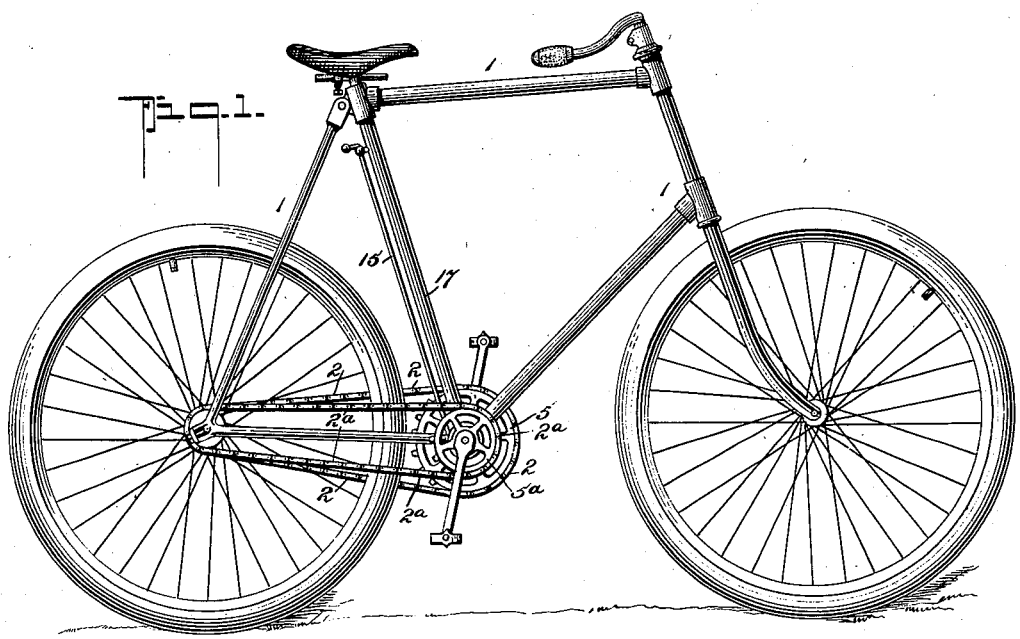
Figure 2:
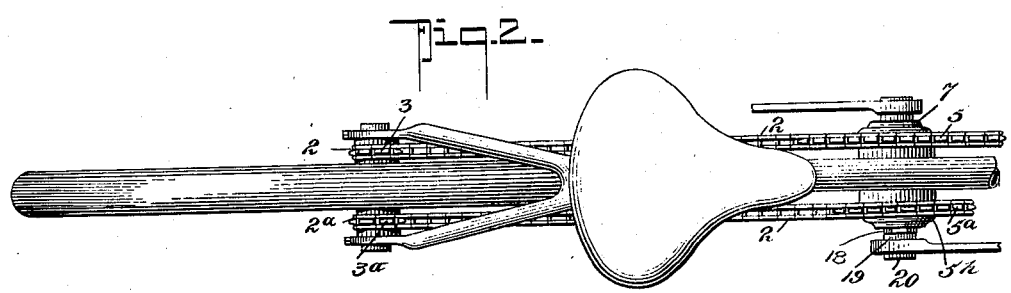
Figure 3:
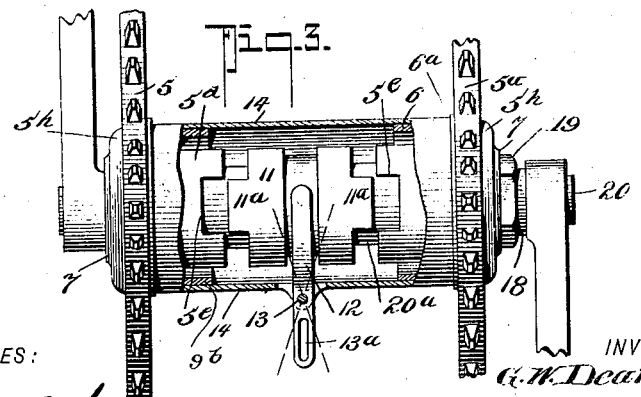

Figure 1 is a side elevation of a bicycle equipped with my improvements. Fig. 2 is a top plan view thereof. Fig. 3 is a plan view of the shifting clutch devices, parts of the inclosing casing being removed. Fig. 4 is a longitudinal section of the crank-axle shaft and the gear mechanism connected therewith, taken practically on the line 4 4 of Fig. 5. Fig. 5 is a transverse section taken on the line 5 5 of Fig. 4 looking in the direction of the arrow. Fig. 6 is a detail view illustrating one end of the crank-axle, one of the fastening-cones, and the securing-nut. Fig. 7 illustrates a modified arrangement of one of the hub members, and Fig. 8 is a detail view of one of the internal cuffs or ball-bearing members hereinafter specifically referred to.

Referring to the accompanying drawings, in which like numerals indicate like parts in all the figures, 1 indicates the bicycle-frame, which in its general arrangement may be of the ordinary "safety" type, with the exception that the rear-fork frame is sufficiently separated at the lower ends to admit of a proper setting of the drive-chain at each side of the drive-wheel, as clearly shown in Fig. 2, in which 2 indicates the drive-chain at one side, and $2^a$ the drive-chain at the other side, which chains pass over chain-wheels 3 $3^a$ on the drive-wheel axle.

By referring now more particularly to Fig. 4, in which the construction of the crank-axle and the component parts of the drive-gearing is best illustrated, 20 indicates the axle, which has a central enlarged portion $20^a$, the extremities of which merge with the end portions of the axle in such manner as to form conical bearing portions $20^b$ for the small bearing-balls $5^c$, which are held in place by the hub portions $5^d$ of the drive-wheels 5 $5^a$. The construction of such hub portions, together with the detachable tubular cuffs 6, forms the essential features of this invention. The hub members $5^d$, it will be observed, project laterally inward over the reduced ends of the crank-axle, their extremities being projected to lap over the enlarged or swelled portion $20^a$ on the axle and provided with clutch-recesses $5^e$, said ends also having annular ball-races or bearing portions $5^f$.

The hub members 5 on their outer faces are formed with a ball-race $5^g$, and from such races said hub members are curved outward, as at $5^h$, to form a closure-face, against which the cones 7 are adapted to contact sufficiently to exclude dirt and dust from the bearing-balls $7^\times$, which seat in the races $5^g$ and the coincident ball-races in the cones 7. The curving outward of the hubs, as stated, also serves another purpose, as it admits of forming an internal ball-race $5^h$ to receive the large bearing-balls 8, which are securely held to their proper position by the detachable tubular cuffs 6, provided with annular external flanges 6ª, adapted to fit the annular seats 5ⁱ in the hubs 5, and each having a reduced portion 9ᵇ, terminating in the shoulder 6ª, the purpose of which will presently appear.

The enlarged or swell portion 20ª of the shaft has a feather or key 10, on which is held for lateral adjustment and to turn with the axle the sliding clutch 11, the opposite ends of which terminate in end clutch-lugs 11ª, which when the said clutch member is properly shifted are adapted to alternately engage with the clutch-recesses of the hubs, as clearly shown in Fig. 3, and to provide for conveniently and easily shifting the clutch I employ a bifurcated shifting-lever 12, fulcrumed on a bearing-pin 13, mounted on a frame tubing-section 14, and having its end extended outside of such casing, preferably to the rear thereof, as shown in Fig. 5, and slotted, as at 13ª, to receive the crank end 15ª of the rock-lever 15, suitably journaled on the rear of the seat-post 17, and having a handle projected within convenient reach of the driver's seat. So far as described it will be readily observed that by shifting the lever 15 the rider can adjust the clutch to engage with either of the hubs at opposite sides of the machine, or he can set the clutch centrally of the said hub members, as shown in Fig. 3, and thereby permit the machine to run free, particularly on declivities, as the rider rests his feet on the pedals.

It will be understood that when the clutch is shifted into engagement with the drive-gear at one side the drive chain and gear at the other side will run free, it being also obvious that the relative diameters of the drive-wheels 5 may be as desired.

In the practical application of my invention it is intended that the hub members be constructed with flanges, as shown in Fig. 6, so as to receive the drive-gears 5ˣ of different diameters, which may be secured thereto by suitable balls or clamps.

In the assembling of the parts constituting my mechanism the sliding clutch member is first fitted onto the crank-axle, after which the drive-gears, with their hubs and the cuff members, are secured on their respective ends on the crank-axle, it being understood that before the hubs, with their cuff members, are fitted together the casing 14 is properly placed in position. The outer cone 7 is then fitted over the threaded end 20ᶜ of the axle, after which the jam-nut 18 is made tight on the threaded portion of the axle and a washer 19 fitted thereagainst, after which the adjacent pedal member is made secure to the extremity of the threaded end of the axle, as shown, it being understood that as the nut is screwed home and the two drive-wheels are drawn toward each other the shouldered portions of the tubular cuff members 6 are tightly impinged against the end of the casing 13, and thereby securely held in place, it being understood that the casing in practice is secured to the framework, so as to be rigidly held, such casing forming a positive dust or dirt excluding cap and also a means for properly guiding and holding the extended portions of the cuff members in proper position.

It will thus be seen by constructing the hub members as shown and described a very simple form of mechanism for the purposes is provided, which can be very economically constructed, with the ball-races arranged in such manner as to properly equalize the bearings of the drive-gears on the axle-frame, such construction admitting of the ready disconnecting and assembling of the parts and an easy application of the bearing-balls.

The several parts, while having a very stable and firm connection with each other, are so joined as to reduce the gripping or torsional strain thereof to a minimum. Furthermore, the arrangement of the several parts constituting the improvements is such that they can be easily and economically manufactured, and in the case of breakage of any one of the parts a new part can be readily supplied without requiring any changes of the remaining parts.

It is obvious that my form of axle-bearings may be used on bicycles having but a single drive-chain, in which event one of the hubs may be formed without any drive-gear or driving-gear-attaching means, as shown, for example, in Fig. 7.

By arranging the different ball-races in the manner shown more particularly in Fig. 4 the drive-gears will have a uniform bearing-surface against the casing of the frame, and thereby overcome any tendency of an irregular or rocker action on the bearing-balls riding on the shaft and the similar balls riding on the cones.

Having thus described my invention, what I claim, and desire to secure by Letters Patent, is—

As an improvement in bicycle drive-gearing, the combination with the drive-gear; the crank-axle, said axle having a centrally-enlarged portion terminating at the ends in ball-races and having a threaded end; a drive-gear mounted on each end of the axle each having an internal annular groove or socket, each having an inwardly-extending hub portion having its inner end projected over the enlarged portion of the axle and terminating in clutch members; and a ball race or groove to receive the bearing-balls 5ᶜ, said hubs having ball-races 5ᵍ on their outer faces and outwardly-curved portions 5ʰ forming the counterpart of the bearing-cones; the bearing-cones; the said outwardly-curved portions forming ball-races on their inner sides, said races terminating in annular depressed seats 5ⁱ; the detachable cuffs 6, having shouldered portions 6ª, adapted to project within the annular grooves or seats 5ⁱ, of the drive-gear hubs, said cuffs having races adapted to bear against the bearing-balls 8; a casing surrounding the clutch mechanism, said casing forming a fixed part of the bicycle-frame, the ends thereof abutting the shoulder 6ª of the cuffs; the lock-nuts 18 and the pedals; the sliding clutch 11ª, mounted on the crank-axle shaft and means for operating said clutch, all being arranged substantially as shown and for the purposes described.

GEORGE W. DEAFENBAUGH.

Witnesses:
D. W. COOPER,
A. P. DEAFENBAUGH.